United States Patent

Smith et al.

Patent Number: 6,094,278
Date of Patent: Jul. 25, 2000

[54] METHOD AND APPARATUS FOR REDUCING PRINTER MEMORY

[75] Inventors: Marcus A. Smith; John F. Mauzey, both of Boise, Id.

[73] Assignee: Hewlett-Packard Company, Palo Alto, Calif.

[21] Appl. No.: 08/936,568

[22] Filed: Sep. 24, 1997

[51] Int. Cl.[7] ................................... G06K 15/00
[52] U.S. Cl. ........................ 358/1.16; 358/1.17
[58] Field of Search .................... 395/114, 115, 395/853, 855, 872, 873, 875, 885, 888, 116, 117; 382/180, 232, 233, 234, 235, 276, 283, 284, 294, 303, 304; 358/524, 261.2–261.4, 430, 444, 450, 462, 467, 1.17, 1.18, 1.16, 1.15; 710/32, 34, 51, 52, 54, 64, 67

[56] References Cited

U.S. PATENT DOCUMENTS

| | | | |
|---|---|---|---|
| 5,274,761 | 12/1993 | Davidson et al. | 345/526 |
| 5,542,031 | 7/1996 | Douglass | 395/114 |
| 5,715,382 | 2/1998 | Herregods et al. | 395/117 |
| 5,729,665 | 3/1998 | Gauthier | 395/117 |
| 5,859,954 | 1/1999 | Toda | 395/102 |

FOREIGN PATENT DOCUMENTS

| | | |
|---|---|---|
| 0093244A2 | 2/1983 | European Pat. Off. . |
| 0658042A1 | 11/1994 | European Pat. Off. . |
| 0689342A2 | 6/1995 | European Pat. Off. . |
| 2263603A | 11/1993 | United Kingdom . |

OTHER PUBLICATIONS

"PLC Implementor's Guide (v6.0)", Hewlett–Packard Company, 1995, pp. 18–8 –18–10.

"PostScript Language Reference Manual", Second Edition, Adobe Systems Incorporated, 1990, pp. 379.

*Primary Examiner*—Arthur G. Evans
*Attorney, Agent, or Firm*—Matthew L. Wade

[57] ABSTRACT

A system for reducing memory resources required to process a print job having common page print data. Reduction of memory resources is accomplished by first analyzing pages from an application for common page aspects and unique page aspects. The common page aspects are then converted to common page print data and the unique page aspects are converted to unique page print data. The common page print data is identified in a manner allowing for an optimized form of the common page print data to be created. An optimized form of the common page print data is then created and stored. The common page print data is merged with the unique page print data in an appropriate manner. Each page is then printed. The invention has particular benefits for presentation applications using the same background for each page in a set. Other applications can also benefit.

9 Claims, 3 Drawing Sheets

METHOD AND APPARATUS FOR REDUCING PRINTER MEMORY

FIELD OF THE INVENTION

This invention relates to computers and page printers and more particularly to computers and page printers handling data with common page aspects.

BACKGROUND OF THE INVENTION

The amount of time it takes to print from an application to a printer (printing time) can have a direct effect on the user's productivity. As a result, there is a strong interest in developing techniques to improve printer performance by reducing bottlenecks effecting print time. In addition there is a strong interest in developing techniques to reduce required memory resources of a printer as this reduces the overall cost of a printer.

Most printers receive print data from a host computer in the form of a printer control language data stream (data stream) over a standard interface between host and printer. The data stream includes print function commands with interspersed print data. One potential bottleneck that may effect printing time is transmission time of the data stream from host computer to printer. Transmission time generally increases as the amount of print data and printer resolution increases. Transmitting common page print data only once to the printer may reduce print job transmission time by reducing the amount of print data that is required to be transmitted. The common page print data can then be stored in printer memory and thereafter only unique page print data need be transmitted to the printer.

Common page print data are representative of common page aspects between pages that are to be printed. FIG. 1 illustrates the meaning of the terms "common page aspects" and "unique page aspects". In FIG. 1 a page set 2 from a presentation application is shown. The page set 2 has a common page background 4. In addition, each page within the page set 2 has unique page information as depicted by pages 6, 8, 10. The common page background 4 is an example of the common page aspects from page set 2 and the text shown on pages 6, 8, 10 are examples of unique page aspects from page set 2.

Various printer control languages allow for identification of common page print data by the use of particular print function commands. A commonly used printer control language, PCL 5, permits common page print data to be identified by the use of the Macro 11 "Create Bitmap of Macro" command. When this command is used, the common page print data is rasterized and stored into printer memory. Thereafter the rasterized version of the common page print data may be combined with unique page print data and printed by use of the Macro 4 "Enable Macro For Overlay" command. These commands are fully described in the PCL Implementor's Guide, Version 6.0, May 1, 1995, pp. 18-8 to 18-10, inclusive. Those pages are incorporated herein by reference as if set out in full. Another commonly used printer control language, POSTSCRIPT, has somewhat similar capability by the use of the "Copypage" command. This command causes the current rasterized page (e.g., a rasterized version of the common page print data) to be combined with the next page (e.g., unique page print data) in the data stream. This command is described in the POSTSCRIPT Language Reference Manual, Second edition, pp. 379. This page is incorporated herein by reference as if set out in full.

As printers advance in capability (e.g., the addition of 24 bit color capability) the amount of print data required to represent a page increases. As a result, various data compression techniques are used to reduce the memory requirements (and thereby reducing cost) of these advanced printers. For instance, in U.S. Pat. No. 4,558,302 a well known data compression technique for printers is described. The disclosure of U.S. Pat. No. 4,558,302 is incorporated herein by reference as if set out in full.

SUMMARY OF THE INVENTION

Unfortunately, the current implementation of printer control languages to identify common page print data does not allow for data compression techniques to convert common page print data to an optimized form for storage. As an example, using the PCL 5 "Macro 11" to identify common page print data forces the creation of a rasterized version of the original common page print data. In addition, the original version of the common page print data must also be retained in memory. This can result in a highly redundant representation of the common page print data in memory.

In this invention it is recognized the current implementation of printer control languages represents a serious problem for presentation applications. Presentation applications allow for the use of previously developed (often by the application manufacturer) and highly sophisticated backgrounds. These backgrounds are often very colorful and contain many graphical features. Often a user will make use of one background for an entire presentation. In such a case, the common page aspects comprise the common page background used for the pages in the presentation. It follows the amount of print data required to represent the common page background is very large. It also follows storing two uncompressed representations of common page print data in memory is highly inefficient.

Therefore, it is an object of the present invention to provide an improved apparatus and method for the treatment of common page print data. It is a further object of the present invention to provide an improved apparatus and method for handling print data originating from presentation applications. Reduction of memory resources is accomplished by first analyzing page data for common page aspects and unique page aspects therein. The common page aspects are converted to common page print data. The common page print data is then identified in a manner allowing for an optimized form of the common page to be created. The common page print data is then converted to an optimized form and stored. The optimized common page print data is then rasterized and merged with a rasterized unique page. The merged pages are then printed.

DETAILED DESCRIPTION OF THE PREFERRED EMBODIMENT

This invention takes advantage of the use of common page print data to reduce print job transmission time and adds the ability to store the common page print data in an optimized form. The ability to store the common page print data in an optimized form reduces the memory requirements of a printer, thereby reducing the cost of the printer.

Figure 1:
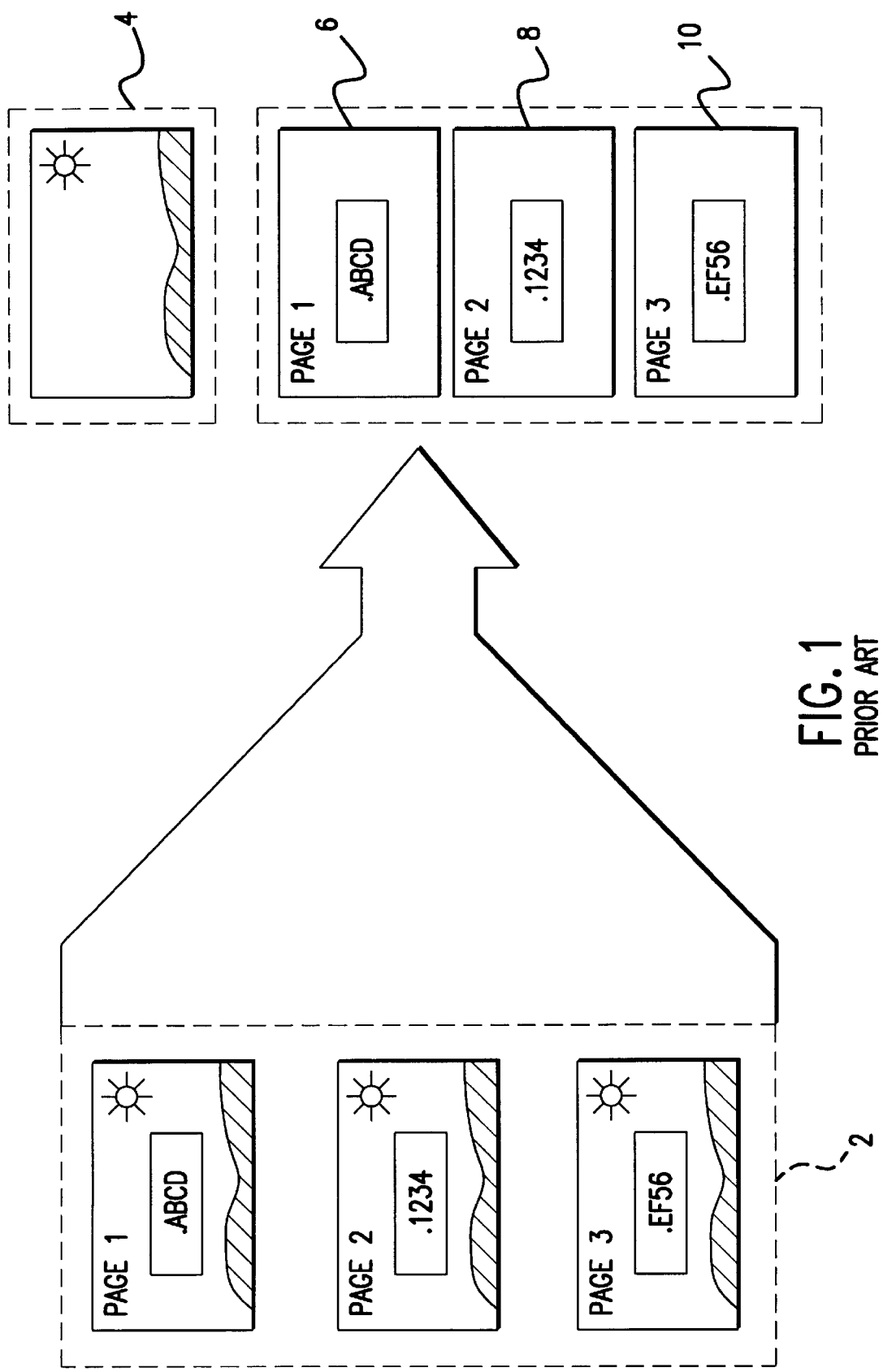
FIG. 1 is an abstract diagram illustrating an example of common page data aspects and unique page aspects.
Figure 2:
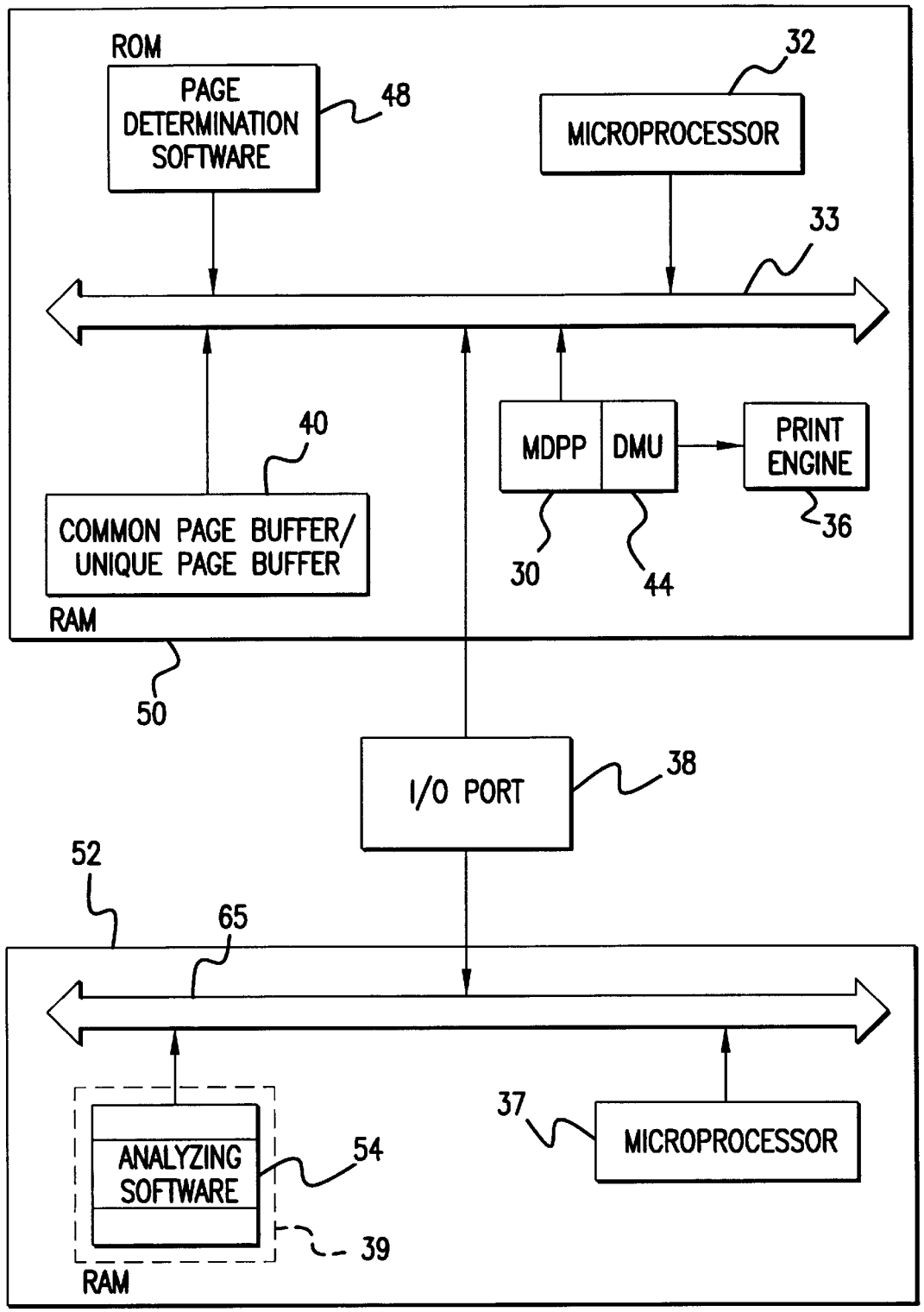
FIG. 2 is a high level block diagram of a page printer and a host system that embodies the apparatus of the invention.

Turning now to FIG. 2, a high level block diagram is shown of a page printer and a host system incorporating the invention consisting of a host 52 and a page printer 50. To illustrate the invention, it will be assumed that host 52 and page printer 50 employs the printer control language known as PCL. The use of PCL to illustrate this invention is merely exemplary and other printer control languages are contemplated.

Host 52 is represented by a microprocessor 37 and a random access memory (RAM) 39, each interconnected via bus 65. RAM 39 holds software that controls certain aspects of microprocessor 37 including analyzing software 54. Microprocessor 37 makes use of analyzing software 54 for performing the following functions:

1. analyzing pages from an application for common page aspects and unique page aspects therein;
2. converting an instantiation of the common page aspects into common page print data and converting the unique page aspects into unique page print data, and;
3. identifying the common page print data in a manner allowing for an optimized form of the common page print data to be created.

I/O port 38 is connected to both host 52 and page printer 50 and provides interface capability between host 52 and page printer 50.

Page printer 50 includes a microprocessor 32, a ROM 48 having page determination software, a random access memory (RAM) 40, a multi-path data processing pipeline (MDPP) 30 and a print engine 36 each interconnected via bus 33. RAM 40 includes two pre-allocated buffers: the first buffer for storing optimized common page print data and the second buffer for storing optimized unique page print data. MDPP 30 includes a data merge unit (DMU) 44.

MDPP 30 provides converting functionality for converting common page print data and unique page print data to an optimized form. The internal operation of MDPP 30 is described in the copending patent application entitled: "MULTI-PATH DATA PROCESSING PIPELINE" having attorney's docket number 10960103-1. That patent application is assigned to the same assignee as this application and is incorporated by reference herein as if set out in full. DMU 44 provides merging functionality for merging the common page print data with unique page print data. The internal operation of DMU 44 is further described in the copending patent application entitled: "DATA MERGE UNIT" having attorney's docket number 10960110-1. That patent application is also assigned to the same assignee as this application and is incorporated by reference herein as if set out in full. Page printer 36 in the exemplary embodiment is a color laser printer that employs an electrophotography drum imaging system.

The use of MDPP 30 to convert the common page print data to an optimized form is merely exemplary. A printer employing other print data optimization techniques can equally benefit from the present invention. For example, a printer employing the print data optimization technique described in the patent entitled "METHOD AND APPARATUS FOR PREVENTING PRINT OVERRUNS" having U.S. Pat. No. 5,129,049 could equally benefit from this invention. That patent is incorporated herein by reference as if set out in full.

In addition, the use of DMU 44 to merge the common page print data and the unique page print data is also merely exemplary. For example, merging may be accomplished in any storage device able to receive rasterized print data or other types of page marking print data.

The operation of page printer 50 and host 52 shown in FIG. 2 commences with microprocessor 37 (under the direction of analyzing software 54) performing the following four functions. First, pages are analyzed (from the application) for common and unique page aspects. Second, the common and unique page aspects are converted to common and unique page print data respectively. Third, a data stream is created that is comprised of the common and unique page print data. The data stream includes a header portion comprised of a common page PCL escape sequence. The common page PCL escape sequence identifies the common page print data. Fourth, the data stream containing the identified common page print data and unique page print data is transmitted via I/O port 38 to page printer 50.

The common page PCL escape sequence just described represents an extension of the PCL language developed for the implementation of this invention. Unlike previous printer control language commands for identifying common page print data (as discussed above) the common page PCL escape sequence does not force the common page print data to be stored in any particular form.

Microprocessor 32, under the direction of the page determination software in ROM 48 scans the header portion of the received data stream. Thereafter, microprocessor 32 responsive to the detection of the common page PCL escape sequence determines the first page within the incoming data stream is common page print data. As a result of this determination, the common page print data is extracted and sent to MDPP 30 for conversion to an optimized form. After conversion, the common page print data now in an optimized form is stored into the common page buffer in RAM 40.

As a result of determining the first page in the data stream to be common page print data, microprocessor 37 recognizes the next page in the data stream as unique page print data and transmits this to MDPP 30 for conversion to an optimized form. After conversion, the optimized unique page print data is then stored into the unique page buffer in RAM 40.

In a further aspect of this invention, microprocessor 32 transmits the optimized common page print data and the optimized unique page print data to MDPP 30 for merging. To accomplish merging, the optimized common page print data is first rasterized by MDPP 30. The rasterized common page print data is then appropriately transmitted to DMU 44. In this manner, DMU 44 is initialized by the rasterized common page print data. Previous techniques for initializing a video buffer include transmitting a series of zeros to the video buffer. Each zero represents a white background pixel for the page that is to be printed. Alternatively, as is pointed out above and claimed in the present invention, the initialization of DMU 44 with rasterized common page print data eliminates this step and results in a more efficient process of handling common page print data.

The unique page print data is then also rasterized and transmitted to DMU 44. Where a pixel of the rasterized common page print data (common pixel) has the same address as a pixel corresponding to the rasterized unique page print data (unique pixel), the common pixel is merged appropriately with the unique pixel. In this manner a raster image is formed within DMU 44 that represents the intent of the user for the first page. The final and complete page is then printed by print engine 36. This process is repeated for every additional page.

Figure 3:
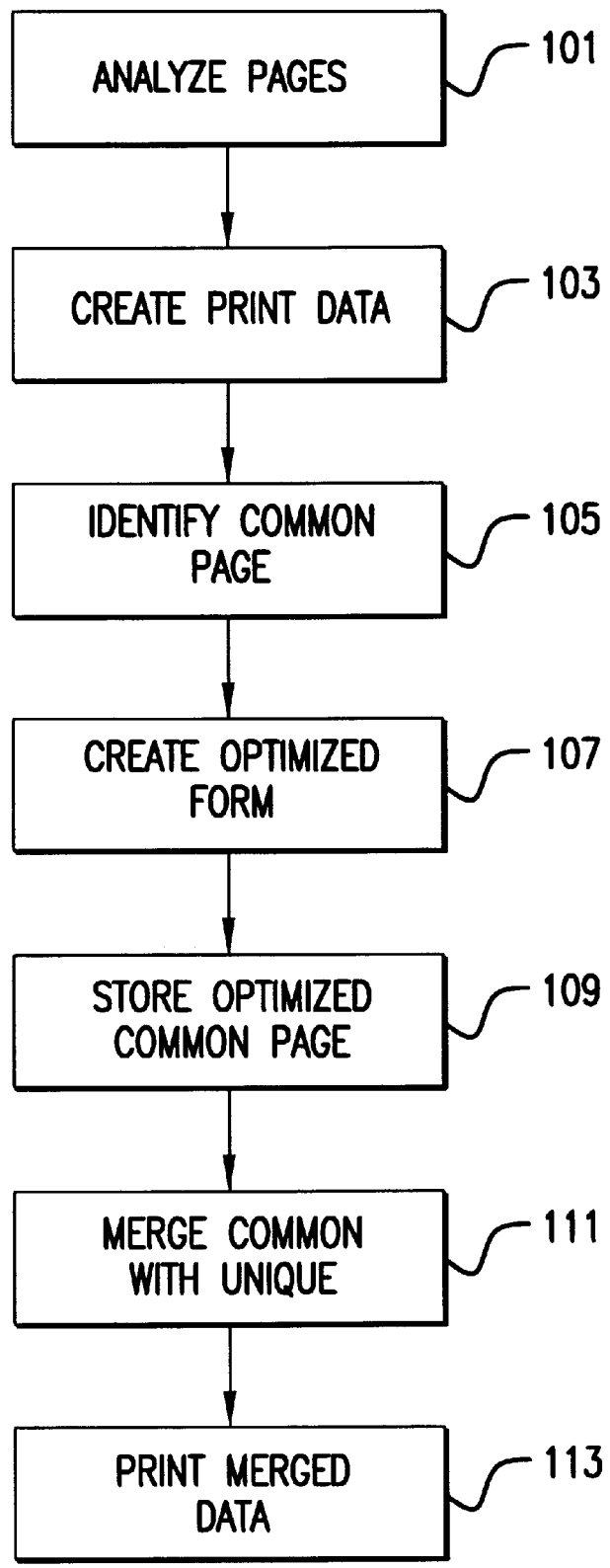
FIG. 3 is a flow diagram depicting a method for the treatment of common page print data.

Turning now to FIG. 3, a method for printing pages having common page aspects is described. As shown in box 101, the first step consists of analyzing pages for common page aspects and unique page aspects.

The common page aspects are then converted to common page print data as shown in box 103. In addition, the unique page data is converted to unique page print data (also shown in box 103). In this embodiment the common page print data and the unique page print data are expressed in PCL. However, the use of PCL is merely exemplary and other control languages such as POSTSCRIPT or HPGL are also contemplated.

As shown in box 105, the common page print data is then identified in a manner allowing for an optimized form of the common page print data to be later created. This is accomplished by the creation of a data stream having a header portion. The header portion includes a common page PCL escape sequence followed by the common page print data.

An optimized form of the common page print data is then created, as shown in box 107 and stored into memory, as shown in box 109. The common page print data and unique page print data are appropriately merged as shown in box 111. The merged pages are then printed as shown in box 113.

In the exemplary embodiment taught herein of this method, the analyzing step as depicted by box 101 is for execution by a host. However, other embodiments contemplated include the analyzing step for execution by a printer or a print server. Also, in the exemplary embodiment the conversion of common page print data to an optimized form and the conversion of unique page print data to an optimized form are for execution by a MDPP. As mentioned previously, the MDPP is described in the copending application entitled: "MULTI-PATH DATA PROCESSING PIPELINE" having attorney's docket number 10960103-1.

In yet another aspect of this invention, the common page PCL escape sequence that is used to identify the common page print data includes a field (naming field) that may be used to uniquely name the common page print data. This provides greater flexibility in making use of common page print data and is an additional novel feature of the present invention. As an example, a page set from a presentation application may have two subsets of pages. Each subset having its own common page aspects. The naming field allows for the separate processing of the common page print data corresponding to each subset. The unique page print data from each subset includes the name of the corresponding common page print data and is merged accordingly.

This invention has benefits for printers handling print data wherein the common page print data is large relative to the available memory resources of the printer. As mentioned previously, prior implementations of printer control languages such as PCL or POSTSCRIPT do not allow for the conversion of common page print data to an optimized form. This is a particular problem associated with applications such as presentation applications wherein the common page print data can be very large. This invention identifies this problem and provides a solution by providing the capability to convert the common page print data to an optimized form for storage.

It should be understood that the foregoing description is only illustrative of the invention. Various alternatives and modifications can be devised by those skilled in the art without departing from the invention. While the invention has been described in a laser printer environment, it is equally applicable to other types of output devices which may benefit by making use of common page print data (e.g. ink jet printers). Accordingly, the present invention is intended to embrace all such alternatives, modifications and variances that fall within the scope of the appended claims.

What is claimed is:

1. Apparatus adapted for printing pages having common page aspects comprising:
   a. page analyzer for identifying and outputting said common page aspects and unique page aspects from page data;
   b. converting apparatus for converting at least one instantiation of said common page aspects into common page print data and for converting said unique page aspects into unique page print data, said converting apparatus connected to an output of said page analyzer;
   c. identifying apparatus for identifying said common page print data in a manner allowing for an optimized form to be created of said common page print data and to allow for appropriate merging with said unique page print data, said identifying apparatus connected to an output of said converting apparatus;
   d. optimizer apparatus for converting said common page print data to an optimized form, said optimizer apparatus connected to an output of said identifying apparatus;
   e. storing apparatus for storing at least one instantiation of said common page print data in said optimized form, said storing apparatus connected to an output of said optimizer apparatus, and;
   f. merging apparatus, including a buffer device capable of receiving raster print data, for merging said common page print data with said unique page print data to create appropriately merged print data, said merging apparatus including capability to convert common page print data stored in said storing apparatus to a raster form and to convert said unique page print data to a raster form, said merging apparatus further includes capability to initialize said buffer device with said common page print data in said raster form and thereafter to merge said common page print data with said unique page print data by transmitting said unique page print data in said raster form to said buffer device, said merging apparatus connected to an output of said storing apparatus.

2. Apparatus as recited in claim 1 wherein said page analyzer resides within a printer.

3. Apparatus as recited in claim 1 wherein said page analyzer resides within a print server.

4. Apparatus as recited in claim 1 wherein said page analyzer resides within a host.

5. Apparatus for printing a set of pages having one or more subsets of pages and each of said subset of pages having common page aspects therein, said apparatus comprising:
   a. page analyzer for identifying and separately outputting said common page aspects and unique page aspects for each of said subsets of said set of pages;
   b. converting apparatus for converting said common page aspects received from said page analyzer into one or more uniquely named common page print data and for converting said unique page aspects received from said page analyzer into unique page print data said unique page print data having a reference to associated common page print data, converting apparatus connected to an output of said page analyzer;
   c. identifying apparatus for identifying said uniquely named common page print data received from said converting apparatus in a manner allowing for an optimized form to be created of said uniquely named common page print data and to allow for appropriate merging with said unique page print data, said identifying apparatus connected to an output of said converting apparatus;
   d. optimizer apparatus for converting one or more of said uniquely named common page print data received from said identifying apparatus to an optimized form, said optimizer apparatus connected to an output of said identifying apparatus;

e. storing apparatus for storing one or more of said uniquely named common page print data received from said optimizer apparatus in said optimized form, said storing apparatus connected to an output of said optimizer apparatus; and;

f. merging apparatus, including a buffer device capable of receiving raster print data, for merging said common page print data with said unique page print data to create appropriately merged print data, said merging apparatus connected to an output of said storing apparatus; and wherein said merging apparatus includes capability to convert common page print data stored in said storing apparatus to a raster form and to convert said unique page print data to a raster form, said merging apparatus further includes capability to initialize said buffer device with said common page print data in said raster form and thereafter to merge said common page print data with said unique page print data by transmitting said unique page print data in said raster from to said buffer device.

6. A method for printing pages having common page data aspects, the method comprising the steps of:

a. analyzing said pages for common page aspects and unique page aspects therein;

b. creating print data by converting at least one instantiation of said common page data aspects into common page print data and converting said unique page data aspects into unique page print data;

c. identifying said common page print data in a manner allowing for an optimized form of said common page print data to be created and to allow for appropriate merging with said unique page print data;

d. converting said common page print data to an optimized form;

e. storing at least one instantiation of said common page print data in said optimized form;

f. merging said common page print data with said unique page print data to create appropriately merged print data, said merging step comprising the following substeps:

(i) converting said common page print data to a raster form;

(ii) converting said unique page print data to a raster form;

(iii) initializing a buffer device with said raster form of said common page print data; and (iii) thereafter transmitting said raster form of said unique page print data to said buffer device; and, g. printing said merged print data.

7. A method as recited in claim 6 wherein said analyzing step for execution by a printer.

8. A method as recited in claim 6 wherein said analyzing step for execution by a print server.

9. A method as recited in claim 6 wherein said analyzing step for execution by a host.

* * * * *